United States Patent
Seo et al.

(10) Patent No.: US 8,542,919 B2
(45) Date of Patent: Sep. 24, 2013

(54) METHOD AND SYSTEM FOR CORRECTING LENS SHADING

(75) Inventors: Kang Hoon Seo, Guri Gyeonggi-do (KR); Min Seok Kim, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 211 days.

(21) Appl. No.: 13/163,859

(22) Filed: Jun. 20, 2011

(65) Prior Publication Data

US 2011/0311156 A1  Dec. 22, 2011

(30) Foreign Application Priority Data

Jun. 22, 2010 (KR) .......................... 10-2010-0059175
Jun. 30, 2010 (KR) .......................... 10-2010-0063071

(51) Int. Cl.
*G06K 9/00* (2006.01)

(52) U.S. Cl.
USPC .......................................................... 382/167

(58) Field of Classification Search
USPC ...... 382/162, 167, 254, 274, 312; 348/222.1, 348/223.1, 241, 251, 365
See application file for complete search history.

(56) References Cited

U.S. PATENT DOCUMENTS

| | | | |
|---|---|---|---|
| 7,956,910 B2 * | 6/2011 | Lim et al. ........................ | 348/252 |
| 8,106,976 B2 * | 1/2012 | Kawasaka ...................... | 348/251 |
| 8,390,693 B2 * | 3/2013 | Yoneyama .................. | 348/222.1 |
| 2007/0285552 A1 | 12/2007 | Kim | |
| 2008/0291302 A1 | 11/2008 | Noh | |
| 2009/0219419 A1 | 9/2009 | Kawasaka | |

FOREIGN PATENT DOCUMENTS

| | | |
|---|---|---|
| KR | 10-0799888 B1 | 1/2008 |
| KR | 10-0808493 B1 | 3/2008 |
| KR | 1020090059512 A | 6/2009 |
| KR | 10-0938167 B1 | 1/2010 |
| WO | WO2004017627 A1 | 2/2004 |
| WO | WO2007124367 A2 | 11/2007 |

* cited by examiner

*Primary Examiner* — Jose Couso
(74) *Attorney, Agent, or Firm* — William Park & Associates Patent Ltd.

(57) ABSTRACT

There is provided an image sensor according to an aspect of the present invention that includes: a reference image luminance extractor partitioning a reference image into a plurality of reference image blocks and extracting luminance values of edge pixels at the edges of each of the plurality of reference image blocks to calculate a luminance weight value for each of the edge pixels; a luminance weight value calculator calculating a luminance weight value of each pixel of the corresponding reference image block on the basis of luminance weight values of edge pixels of the corresponding reference image block with respect to each of the plurality of reference image blocks; and a luminance corrector correcting the luminance of an input image by multiplying the luminance weight value for each pixel calculated by the luminance weight value calculator with respect to a luminance value of each pixel of the input image.

26 Claims, 9 Drawing Sheets

METHOD AND SYSTEM FOR CORRECTING LENS SHADING

CROSS-REFERENCE TO RELATED APPLICATIONS

This application claims the priorities of Korean Patent Application Nos. 10-2010-0059175 filed on Jun. 22, 2010 and 10-2010-0063071 filed on Jun. 30, 2010, in the Korean Intellectual Property Office, the disclosures of which are incorporated herein by reference.

BACKGROUND OF THE INVENTION

1. Field of the Invention

The present invention relates to a method and system for correcting lens shading, and more particularly, to correcting lens shading of an input image by acquiring a luminance weight value for an edge pixel in each block by partitioning a photographed reference image into a plurality of blocks.

2. Description of the Related Art

In general, an image sensor is a device used for photographing an image by using the properties of a semiconductor that reacts to light. An image sensor is a device in which a pixel senses brightnesses and wavelengths of different lights emitted from subjects, and converts the sensed brightnesses and wavelengths into electrical values. Converting the electrical value into a signal processable level is also the role of the image sensor.

That is, the image sensor is a semiconductor element that converts an optical image into an electrical signal. A charge coupled device (CCD) is an element in which metal oxide semiconductor (MOS) capacitors are positioned extremely close to one another, and electrical charges are stored in and transferred to, the capacitors. A complementary metal oxide semiconductor (CMOS) image sensor is an element that adopts a switching type that sequentially detects an output by using a control signal and a signal processing circuit as a peripheral circuit. The CMOS image sensor is formed using MOS transistors in an amount equal to the number of pixels.

The CMOS image sensor has a large advantage in that it has low-power consumption, and therefore is very useful for personal portable systems such as a cellular phone camera, PC camera and the like. The CMOS image sensor can also be applied for various other purposes in addition to those applicable to the consumer electronics field. For example, CMOS image sensors may also be used in the medical field, the toy field, etc., and the like.

An image sensor generally photographs an optical image of a subject through a lens. A problem is created by the lens in that a lens' shading phenomenon causes change of luminance at an edge portion of a photographed image compared to luminance at a center portion of an image. This shading phenomenon is due to, for example, influence of the lens' shape.

Therefore, the lens shading phenomenon should be corrected in order to acquire a more true image. However, in the prior art, after a luminance weight value is acquired for each of the entirety of the pixels of the image sensor in order to correct the lens shading, a method of multiplying a luminance weight value by each pixel of an input image is used. Since the luminance weight value is calculated for all pixels and stored, a memory having a large capacity is required.

SUMMARY OF THE INVENTION

An aspect of the present invention provides a method and system for correcting lens shading of the image sensor capable of correcting a lens shading phenomenon.

According to an aspect of the present invention, there is provided an image sensor that includes: a reference image luminance extractor partitioning a reference image into a plurality of reference image blocks and extracting luminance values of edge pixels at the edges of each of the plurality of reference image blocks to calculate a luminance weight value for each of the edge pixels; a luminance weight value calculator calculating a luminance weight value of each pixel of the corresponding reference image block on the basis of luminance weight values of edge pixels of the corresponding reference image block with respect to each of the plurality of reference image blocks; and a luminance corrector correcting the luminance of an input image by multiplying the luminance weight value for each pixel calculated by the luminance weight value calculator with respect to a luminance value of each pixel of the input image.

According to another aspect of the present invention, there is provided a method for correcting lens shading of an image sensor that includes: partitioning a reference image into a plurality of reference image blocks and extracting luminance values of edge pixels at the edges of each of the plurality of reference image blocks to calculate a luminance weight value for each of the edge pixels; calculating a luminance weight value of each pixel of the corresponding reference image block on the basis of luminance weight values of edge pixels of the corresponding reference image block with respect to each of the plurality of reference image blocks; and correcting the luminance of an input image by multiplying the luminance weight value for each pixel calculated by the luminance weight value calculator with respect to a luminance value of each pixel of the input image.

According to an aspect of the present invention, there is provided an image sensor that includes: a reference image luminance extractor partitioning a reference image into a plurality of reference image blocks and extracting luminance values of four edge pixels at the edges of each of the plurality of reference image blocks to calculate luminance weight values of a plurality of edge pixels; a weight value difference storage storing a luminance weight value difference which is a difference between a luminance weight value of the corresponding edge pixel for each of the plurality of edge pixels and a luminance weight value of an edge pixel adjacent to the corresponding edge pixel; a luminance weight value restorer restoring the luminance weight value difference to the luminance weight value; a luminance weight value calculator calculating a luminance weight value of each pixel of the corresponding reference image block on the basis of luminance weight values of four edge pixels of the corresponding reference image block with respect to the plurality of reference image blocks by using the luminance weight value restored in the luminance weight value restorer; and a luminance corrector correcting the luminance of an imputed image by multiplying a luminance weight value for each pixel calculated in the luminance weight value calculator by a luminance value of each pixel of the input image.

According to another aspect of the present invention, there is provided a method for correcting lens shading of an image sensor that includes: partitioning a reference image into a plurality of reference image blocks and extracting luminance values of four edge pixels at the edges of each of the plurality of reference image blocks to calculate luminance weight values of a plurality of edge pixels; storing a luminance weight value difference which is a difference between a luminance weight value of the corresponding edge pixel for each of the plurality of edge pixels and a luminance weight value of an edge pixel adjacent to the corresponding edge pixel; restoring the luminance weight value difference to the luminance weight value; calculating a luminance weight value of each pixel of the corresponding reference image block on the basis of luminance weight values of four edge pixels of the corresponding reference image block with respect to the plurality of reference image blocks by using the luminance weight value restored in the luminance weight value restorer; and correcting the luminance of an imputed image by multiplying a luminance weight value for each pixel calculated in the luminance weight value calculator by a luminance value of each pixel of the input image.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

An image sensor according to an exemplary embodiment of the present invention will now be described in detail with reference to the accompanying drawings.

Figure 1:
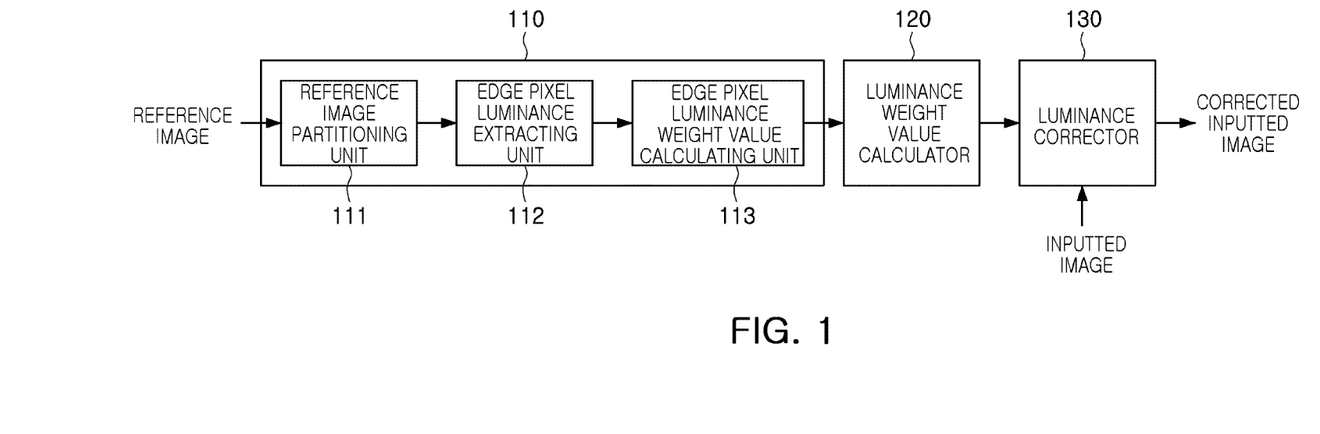
FIG. 1 is a schematic block diagram of an image sensor according to an exemplary embodiment of the present invention.

FIG. 1 is a schematic block diagram of an image sensor according to an exemplary embodiment of the present invention. As shown in FIG. 1, the image sensor 100 includes a luminance extractor 110, a luminance weight value calculator 120 operatively coupled to the luminance extractor 110, and a luminance corrector 130, operatively coupled to the luminance weight value calculator 120.

The terminology "operatively coupled" as used herein refers to coupling that enables operational and/or functional communication and relationships there-between and may include any intervening items necessary to enable such communication such as, for example, data communication buses or any other necessary intervening items that one of ordinary skill would understand to be present. Also, it is to be understood that other intervening items may be present between "operatively coupled" items even though such other intervening items are not necessary to the functional communication facilitated by the operative coupling. For example, a data communication bus may provide data to several items along a pathway along which two or more items are operatively coupled, etc.

The luminance extractor 110 is operative to partition a reference image into a plurality of reference image blocks and to calculate a luminance weight value by extracting luminance values of pixels at four edges of each of the reference image blocks. For convenience, the pixels at the four edges of each reference image block will be referred to as "four edge pixels."

As shown in FIG. 1, the luminance extractor 110 may include a reference image partitioning unit 111, operative to partition an input reference image into a plurality of reference image blocks. The luminance extractor 110 may further include an edge pixel luminance extracting unit 112, operatively coupled to the reference image partitioning unit 111. The edge pixel luminance extracting unit 112 is operative to extract luminance values of four edge pixels at each of the edges of a plurality of partitioned reference image blocks. The luminance extractor 110 may further include an edge pixel luminance weight value calculating unit 113, operatively coupled to the edge pixel luminance extracting unit 112. The edge pixel luminance weight value calculating unit 113 is operative to calculate a luminance weight value of an edge pixel on the basis of, that is, based on, the luminance value extracted from the edge pixel.

The luminance extractor 110 and the various units, the luminance weight value calculator 120 and the luminance corrector 130, may be implemented in the various embodiments in various ways, such as, for example, using hardwired logic, or using one or more processors. The one or more processors may be, for example, a programmable processor having software and/or firmware executing thereon, ASICs, DSPs, etc. Therefore, the various embodiments may be implemented as hardwired logic, processors or combinations thereof. An image sensor as disclosed herein may include any processors, hardwired logic, etc., required to implement the various embodiments as herein described.

The luminance weight value calculator 120 is operative to calculate a luminance weight value of each pixel of the corresponding reference image block on the basis of luminance weight values of four edge pixels of the corresponding reference image block with respect to each of the plurality of reference image blocks.

The luminance corrector 130 is operative to correct the luminance of an input image by multiplying the luminance weight value for each pixel calculated by the luminance weight value calculator 120 with respect to a luminance value of each pixel of the input image.

The image sensor 100 configured as above operates as follows.

First, the image sensor 100 receives a reference image for correcting lens shading from a sensor unit (not shown). The sensor unit may generally include a color filter array, an analog/digital converter, a lens section, and the like.

The color filter array converts an optical subject signal input through the lens section into an electrical signal and outputs the corresponding signal. The color filter array may adopt a bayer pattern which is advantageous in terms of resolution. The analog/digital converter converts the image signal converted by the color filter array into a digital signal.

Figure 2A:
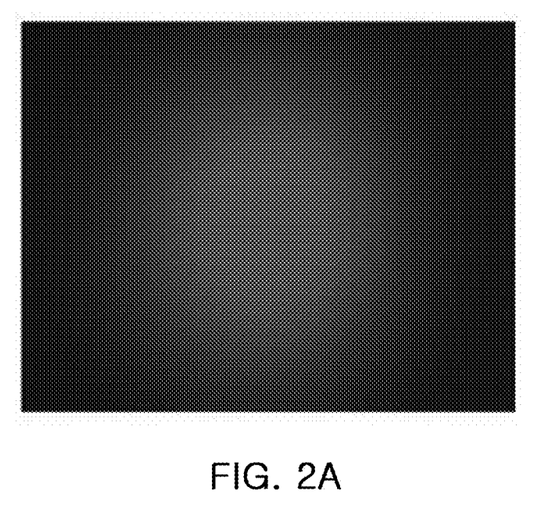
FIGS. 2A and 2B show an example of a reference image having a lens shading phenomenon provided in a sensor unit of an image sensor.
Figure 2B:
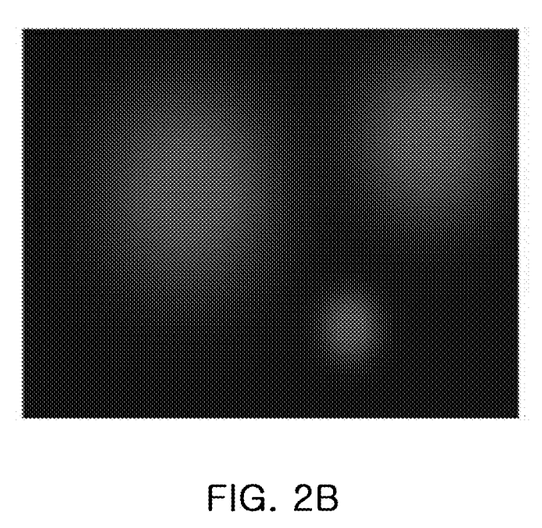

The reference image may be a single-color image and, for example, may be a white image acquired by photographing a white chart. When the reference image is input through the sensor unit, the luminance of the reference image is not uniform due to the lens shading phenomenon. Such an example is shown in FIG. 2. FIGS. 2A and 2B show an example of a reference image having a lens shading phenomenon provided in a sensor unit of an image sensor. FIG. 2A illustrates a reference image of which luminance decreases toward an edge from the center and FIG. 2B illustrates a reference image in which luminance is high at a plurality of points and luminance decreases as it is further from the points. The lens shading phenomenon may occur due to a lens' own characteristic or nonuniformity generated while manufacturing the lens section.

Figure 3:
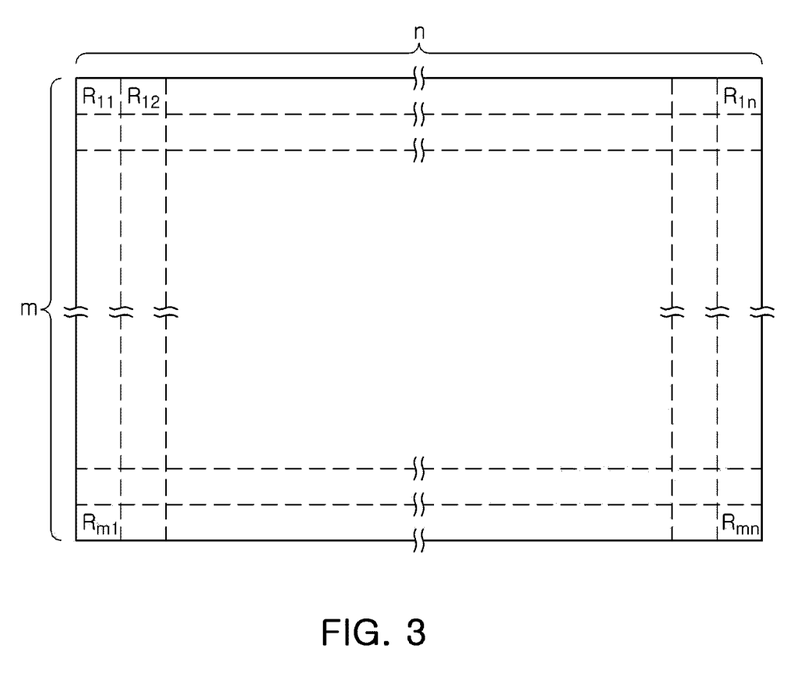
FIG. 3 shows an example of partitioning a reference image.

Returning to FIG. 1, the reference image partitioning unit 111 of the reference image luminance extractor 110 partitions the input reference image into the plurality of reference image blocks. FIG. 3 shows an example of partitioning a reference image. As shown in FIG. 3, the reference image is partitioned into horizontal m reference image blocks and vertical n reference image blocks.

For example, the reference image may be partitioned into 17×13 reference image blocks and in the exemplary embodiment, each block may have a pixel array of 160×160. Therefore, the number of reference image blocks may be variable by the entire pixel array size of the reference image and the pixel array of each block.

Next, the edge pixel luminance extracting unit 112 of the reference image luminance extractor 110 extracts a luminance value of each edge pixel from the partitioned reference image blocks. Since each reference image block has four edges, for example, when the reference image is partitioned into 17×13 reference image blocks, luminance values for a total of 18×14 (=252) edges are extracted.

When all of the luminance values of the edge pixels are extracted, the edge pixel luminance weight value calculating unit 113 of the reference image luminance extractor 110 calculates a luminance weight value for each edge pixel on the basis of all the extracted luminance values. The luminance weight value as a value (gain) multiplied by the pixel value of the input image in order to correct the lens shading phenomenon is set as a large value for a pixel having a dark luminance value by lens shading and in contrast, as a small value for a pixel having a bright luminance value. For example, in the exemplary embodiment, the luminance weight value may be calculated on the basis of the brightest luminance value among the extracted luminance values of all edge pixels in the reference image. That is, the luminance weight value is set as 1 for the pixel having the brightest luminance value and may be set as a value larger than 1 depending on a ratio to the brightest luminance value for a pixel having a luminance value smaller than the brightest luminance value.

The acquired luminance weight value for each edge pixel is stored in a memory such as, for example, SRAM. Accordingly, according to the exemplary embodiment of the present invention, since the weight value is just calculated at only edges in the partitioned reference image blocks without calculating all the weight values for the entirety of the pixels of the reference image, the luminance weight value may be very rapidly calculated and in addition, since the number of luminance weight values is much smaller than that in the case of acquiring the luminance weight values for all the pixels, it is possible to reduce even the capacity of the memory storing the luminance weight value.

The luminance weight value for each edge pixel is preferably calculated for each of Gr, Gb, R, and B constituting the Bayer pattern. Hereinafter, it should be noted that the term "pixel" as used herein may include four individual components that may also be referred to as pixels (and which may also be considered "subpixels") of Gr, Gb, R, and B constituting the bayer pattern. That is, some embodiments may calculate luminance weight values for some, or all, subpixels of the Bayer pattern corresponding to each pixel.

Next, the luminance weight value calculator 120 calculates luminance weight values for all pixels of the corresponding block on the basis of the pixel weight values of four edge pixels of the corresponding block in each reference image block. In the exemplary embodiment, the luminance weight value calculator 120 calculates the luminance weight value of each pixel of the corresponding reference image block in proportion to distances between each pixel and four edge pixels with respect to each reference image block.

Figure 4A:
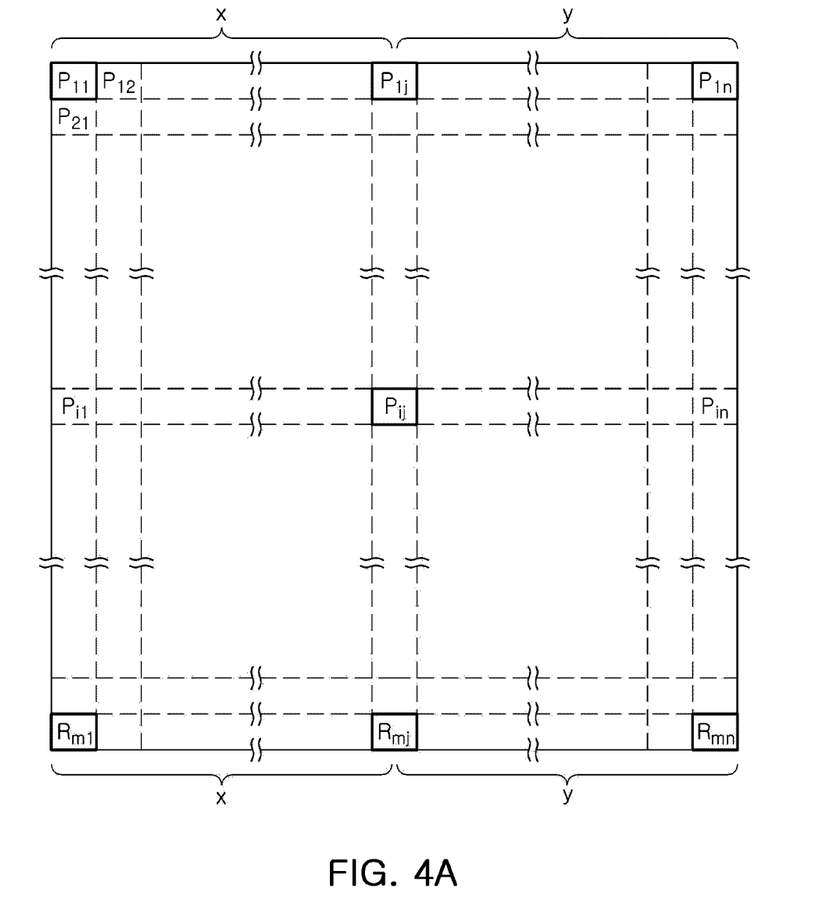
FIGS. 4A and 4B are diagrams describing one example of calculating a luminance weight value for one pixel of a reference image block according to an exemplary embodiment of the present invention.
Figure 4B:
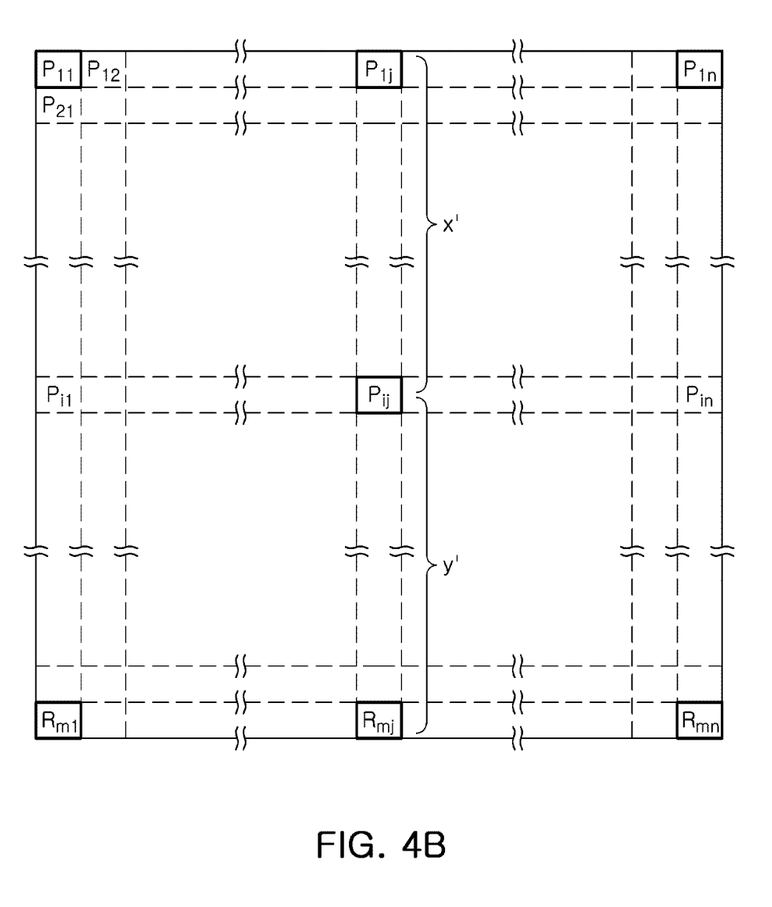

FIGS. 4A and 4B are a diagram describing one example of calculating a luminance weight value for one pixel of a reference image block. In particular, FIG. 4A describes a first step of calculating a luminance weight value and FIG. 4B is a diagram describing a second step of calculating a luminance weight value.

As shown in FIG. 4A, at the first step of calculating the luminance weight value, two pixels $P_{i1}$ and $P_{im}$ which are in the same row as edge pixels $P_{11}$, $P_{1n}$, $P_{m1}$, and $P_{mn}$, among pixels which are in the same column as a pixel $P_{ij}$ of which a luminance weight value is calculated are determined and luminance weight values of the determined pixels are calculated in proportion to distances by using distances x and y from luminance weight values of edge pixels $P_{11}$ and $P_{1n}$ for an edge pixel which is in the same row as the determined pixels, that is, a pixel $P_{i1}$ and luminance weight values of edge pixels $P_{m1}$ and $P_{mn}$, for a pixel $P_{in}$.

Next, as shown in FIG. 4B, at the second step of calculating the luminance weight value, the luminance weight value of two pixels $P_{i1}$ and $P_{in}$, are calculated in proportion to a distance in accordance with distances x' and y' between two pixels $P_{i1}$ and $P_{in}$, acquired at the first step and the corresponding pixel $P_{ij}$ so as to acquire a luminance weight value of the corresponding pixel $P_{ij}$.

Such a process is performed with respect to all the pixels of the reference image block and in addition, such a process is performed even with respect to all the reference image blocks so as to calculate the luminance weight values of all the pixels. Further, the weight calculation method is just one example and another calculation method may also be applied.

The luminance corrector 130 receives an input image and multiplies the luminance weight value corresponding to the pixel calculated in the weight value calculator 120 by the corresponding luminance value for each pixel of the input image. At this time, when the luminance value of each pixel of the input image is corrected, the luminance weight value calculator 120 calculates the luminance weight value of the corresponding pixel and provides the calculated luminance weight value to the luminance corrector 130 in an on-the-fly scheme. Accordingly, the luminance weight value for each pixel does not need to be additionally stored.

In the exemplary embodiment of the present invention, when a corrected pixel value of the pixel of the input image, that is, a pixel value acquired by multiplying a luminance weight value of an original pixel value by the original pixel value is smaller than a predetermined set minimum value, the luminance corrector 130 preferably clamps the pixel value to a minimum value. For example, the minimum value may be 0. Further, when the corrected pixel value of the input image is larger than a predetermined set maximum value, the luminance corrector 130 preferably clamps the pixel value to the maximum value. For example, when the number of bits representing the pixel value is n, the maximum value may be $2^n$. Since the pixel value is a digital value, when the pixel value deviates from a range of a value which can be provided in terms of a characteristic of the digital value, a luminance value of an image actually displayed on a screen may be inverted. Therefore, it is possible to improve the quality of an output image by clamping the pixel value which deviates from the range to the maximum value or the minimum value.

Through such a process, a correction may be made for lens shading for the input images, and the corrected images may be output.

Next, referring to FIG. 5, a method for correcting lens shading of an image sensor according to an exemplary embodiment of the present invention will be described.

Figure 5:
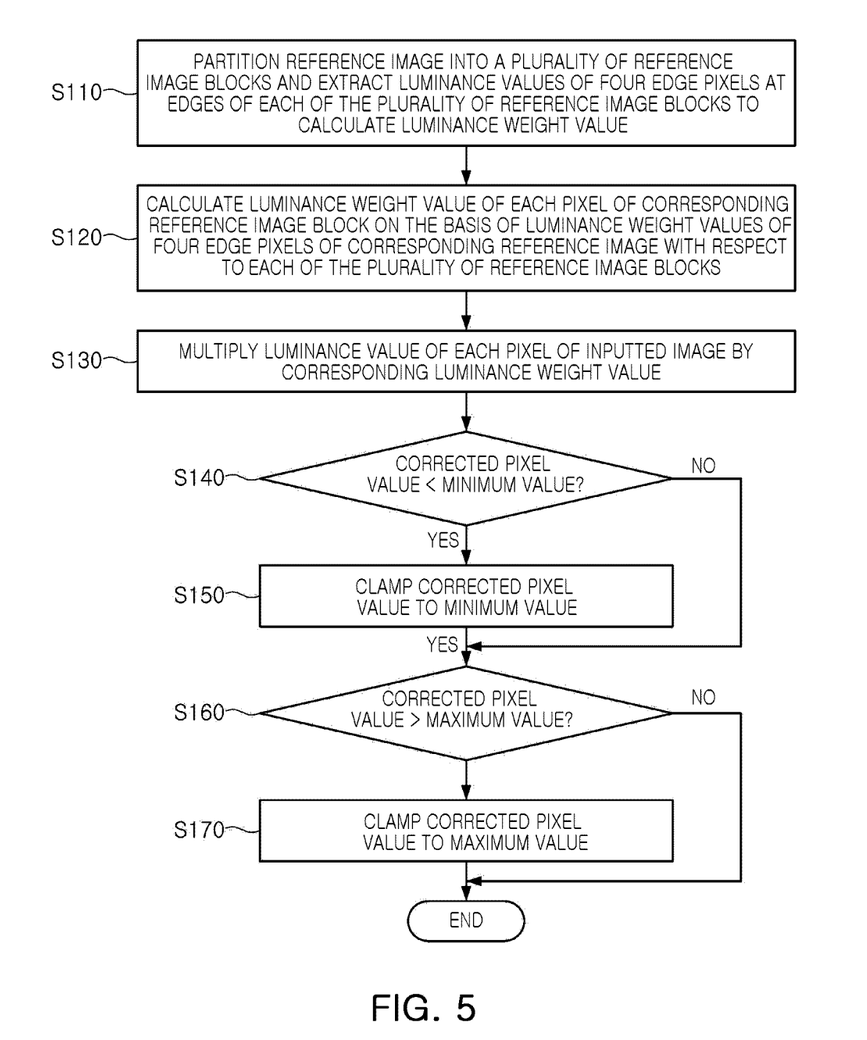
FIG. 5 is a flowchart illustrating a method for correcting lens shading of an image sensor according to an exemplary embodiment of the present invention.

FIG. 5 is a flowchart illustrating a method for correcting lens shading of an image sensor according to an exemplary embodiment of the present invention. As shown in FIG. 5, the method for correcting lens shading of an image sensor according to the exemplary embodiment of the present invention includes extracting the luminance of a reference image (S110), calculating a luminance weight value (S120), correcting luminance (S130), clamping to a minimum value (S140 and S150), and clamping to a maximum value (S160 and S170).

At the extracting of the luminance of the reference image (S110), a reference image is partitioned into a plurality of reference image blocks and luminance values of four edge pixels in each of the plurality of reference image blocks are extracted so as to calculate the luminance weight value. At this time, the luminance weight value may be calculated on the basis of the brightest luminance value among the luminance values of all edge pixels extracted in the reference image.

At the calculating of the luminance weight value (S120), a luminance weight value of each pixel of the corresponding reference image block is calculated on the basis of luminance weight values of four edge pixels of the corresponding reference image with respect to each of the plurality of reference image blocks. At this time, the luminance weight values of four edge pixels of the corresponding reference image block may be calculated in proportion to a distance between each pixel and four edge pixels with respect to each of the plurality of reference image blocks.

During the correcting of the luminance (S130), by multiplying a luminance value of each pixel of an input image by a luminance weight value for each pixel calculated in a luminance weight value calculator, the luminance of the input image is corrected. Thereafter, a corrected pixel value of the pixel of the input image is compared with a predetermined set minimum value (S140) and when the corrected pixel value of the pixel of the input image is smaller than the predetermined set minimum value (S140-YES), the corresponding pixel value is clamped to the minimum value (S150). Further, the corrected pixel value of the pixel of the input image is compared with a predetermined set maximum value (S160) and when the corrected pixel value of the pixel of the input image is smaller than the predetermined set minimum value (S160-YES), the corresponding pixel value is clamped to the minimum value (S170).

A detailed description of the flow diagram illustrated in FIG. 5 corresponds to an operation of the image sensor according to the exemplary embodiment of the present invention described with reference to FIGS. 1 to 4, discussed in detail above.

As such, according to the exemplary embodiment, instead of previously calculating and storing the luminance weight values of all the pixels with respect to the reference image in a memory, the luminance weight values of four edge pixels for each of the partitioned reference image blocks are calculated and the luminance weight values of all the pixels are calculated by using the calculated luminance weight value at the time of correcting the luminance of the input image so as to markedly reduce the size of a memory for storing the luminance weight value for correcting the lens shading.

Further, according to the exemplary embodiment, since the luminance weight value of each pixel is calculated on the basis of the luminance weight value of each edge pixel by partitioning the reference image into the plurality of reference image blocks, the input image may be corrected in the case in which the lens shading phenomenon causes the problems illustrated in FIG. 2A and FIG. 2B. For example, the embodiments provide image correction where luminance decreases toward the edge from the center as shown in FIG. 2A, and also provide image correction in the case where luminance is high at a plurality of points while luminance decreases as it is further away from the plurality of points as shown in FIG. 2B.

Through such a process, a correction may be made for lens shading for the input images, and the corrected images may be output.

Figure 6:
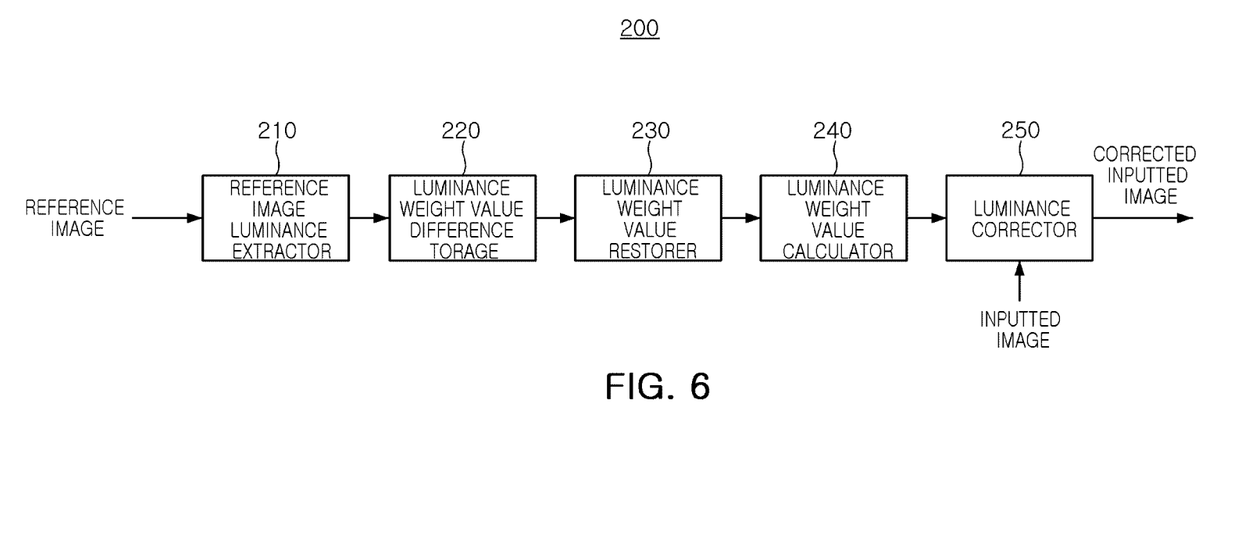
FIG. 6 is a schematic block diagram of an image sensor according to another exemplary embodiment of the present invention.

Referring to FIG. 6, an image sensor according to another exemplary embodiment of the present invention will be described.

FIG. 6 is a schematic block diagram of an image sensor 200 according to another exemplary embodiment of the present invention. As shown in FIG. 6, the image sensor 200 includes a reference image luminance extractor 210, a luminance weight value difference calculator 220 operatively coupled to the reference image luminance extractor 210, a luminance weight value restorer 230 operatively coupled to the luminance weight value difference calculator 220, a luminance weight value calculator 240 operatively coupled to the luminance weight value restorer 230, and a luminance corrector 250 operatively coupled to the luminance weight value calculator 240. The reference image luminance extractor 210, luminance weight value difference calculator 220, luminance weight value restorer 230, luminance weight value calculator 240, and luminance corrector 250, may be implemented in the various embodiments in various ways, such as, for example, using hard wired logic, or using one or more processors. The one or more processors may be, for example, a programmable processor having software and/or firmware executing thereon, ASICs, DSPs, etc. Therefore, the various embodiments may be implemented as hardwired logic, processors or combinations thereof. Further, luminance weight value difference storage may be implemented as including a separate memory, or an integrated memory integrated with, for example, a processor as described above. That is, an image sensor as disclosed herein with respect to FIG. 6 may include any processors, hardwired logic, integrated or separate memory etc., required to implement the various embodiments as herein described.

The reference image luminance extractor 210 is operative to partition a reference image into a plurality of reference image blocks, and calculate luminance weight values of a plurality of edge pixels by extracting luminance values of four edge pixels at each of edges of the plurality of reference image blocks. The luminance weight value difference calculator 220 is operative to calculate a luminance weight value difference, which is a difference between a luminance weight value of an edge pixel for a given edge and a luminance weight value of a corresponding edge pixel on an edge adjacent to the given edge, with respect to each of the plurality of edge pixels. The calculated luminance weight differences may then be stored in a memory such as, for example, SRAM.

If the difference is between a given edge and a previous edge, it may be noted that the first edge may not have a previous edge with which to find a difference. In that case, the difference may be set to zero while the actual luminance weight value may be stored in memory for reference value. Alternatively, the memory that stores the difference values may also store the luminance weight value for first edges. The method of storing these difference values may be design dependent.

The luminance weight value restorer 230 is operative to restore the luminance weight value difference to the luminance weight value. The luminance weight value calculator 240 is operative to calculate a luminance weight value of each pixel of the corresponding reference image block on the basis of the luminance weight values of four edge pixels of the corresponding reference image block with respect to the plurality of reference image blocks. The luminance corrector 250 is operative to correct the luminance of the input image by multiplying the luminance weight value for each pixel calculated by the luminance weight value calculator 240 with respect to a luminance value of each pixel of the input image.

The image sensor 200 configured as above operates as follows.

First, the image sensor 200 receives a reference image for correcting lens shading from a sensor unit (not shown). As described above regarding the image sensor 100, a sensor unit of the image sensor 200 may generally include a color filter array, an analog/digital converter, a lens section, and the like.

Next, the reference image luminance extractor 210 partitions the input reference image into the plurality of reference image blocks. The method utilized for partitioning the reference image may be the same as the exemplary method described with reference to FIG. 3.

When all the luminance values for each edge pixel are extracted, the luminance weight value for each edge pixel is calculated on the basis of the extracted luminance values. The luminance weight value may be calculated in the same manner as the method in which the reference image luminance extractor 210 extracts the luminance.

When the luminance weight value is calculated, the reference image luminance extractor 210 outputs the luminance weight value to the weight value difference calculator 220. The weight value difference calculator 220 calculates a difference between the luminance weight value of the corresponding edge pixel and the luminance weight value of an edge pixel adjacent to the corresponding edge pixel with respect to each of the plurality of edge pixels in the luminance weight value of each edge pixel input from the reference image luminance extractor 210 and stores the result as the luminance weight value difference.

For example, the luminance weight value difference calculator 220 uses any one pixel, of the plurality of edge pixels, as a reference edge pixel, and calculates a luminance weight value difference in accordance with a predetermined order from the reference edge pixel to another edge pixel and may store the calculated luminance weight value difference as the luminance weight value difference. At this time, the luminance weight value difference calculator 220 may store a difference between the luminance weight value of the corresponding edge pixel and a luminance weight value of an edge pixel just prior to the corresponding edge pixel in a predetermined order as the luminance weight value difference of the corresponding edge pixel with respect to each of the plurality of edge pixels.

In terms of the characteristic of the lens shading phenomenon, a difference in luminance between two adjacent pixels in the reference image is not large. For example, referring to FIG. 7 which is a schematic diagram for calculating the luminance weight value difference according to the exemplary embodiment of the present invention, the reference edge pixel is E11 and luminance weight value differences between the reference edge pixel $E_{11}$ and edge pixels $E_{12}, E_{13}, E_{14}, \ldots$ arranged at the right side from the reference edge pixel $E_{11}$ are calculated. At this time, values displayed in parentheses of the edge pixels ($E_{11}, E_{12}, E_{13}$, and $E_{14}, \ldots$) are luminance weight values. Next, differences between the luminance weight values of the edge pixels ($E_{12}, E_{13}$, and $E_{14}, \ldots$) and luminance weight values of adjacent edge pixels are calculated. That is, a difference in pixel weight value between the edge pixel $E_{12}$ and the reference edge pixel $E_{11}$, a difference in pixel weight value between the edge pixel $E_{13}$ and the edge pixel $E_{12}$, and a difference in pixel weight value between the edge pixel $E_{14}$ and the reference edge pixel $E_{13}$ are calculated. The calculated values are −5, −7, and −6 which are values shown below the edge pixels. As known in FIG. 3, the luminance weight value difference is smaller than the luminance weight value of each edge pixel. It is to be understood that in the above description, the magnitudes of the luminance weight value and the luminance weight value difference are provided as exemplary and that various different magnitudes, for example, values such as 1, 1.1, 1.2, and the like may be used in accordance with the embodiments.

Therefore, the size of data representing the luminance weight value difference may be smaller than the size of data representing the luminance weight value, thereby markedly reducing the size of a memory for storing the luminance weight value.

Accordingly, according to the exemplary embodiment of the present invention, since the weight value is just calculated at only edges in the partitioned reference image blocks, without calculating the entirety of the weight values for the pixels of the reference image, the luminance weight value may be very rapidly calculated. In addition, since the number of luminance weight values is much smaller than that in the case of acquiring the luminance weight values for all the pixels, and because the luminance weight value is not stored but processed to the luminance weight value difference (which has a smaller magnitude than the luminance weight value) and stored, it is possible to reduce the memory capacity required to store the luminance data (i.e the luminance weight value difference is stored instead of the luminance weight values).

The luminance weight value for each edge pixel is preferably calculated for each of Gr, Gb, R, and B constituting the Bayer pattern. As previously discussed above, the term "pixel" as used herein may include the four Bayer pattern components of Gr, Gb, R, and B. In addition, as described above, the reference image luminance extractor 210 calculates the luminance weight values of all the edge pixels and thereafter, the luminance weight value difference calculator 220 calculates and stores the luminance weight value difference.

However, the invention need not be so limited. Various embodiments of the invention may calculate luminance weight value differences ranging from differences for one pixel from each edge to all pixels from each edge. Similarly, various embodiments of the invention may also form groups of adjacent pixels at an edge of each reference image block and calculate luminance weight value differences between the groups for 2 sequential edges. Therefore, when using groups of pixels, various embodiments of the invention may define a size of groups as being one or more pixel. Additionally, the number of groups used may also vary. The specific number of pixels used in a group and the number of groups used may be design and/or implementation dependent.

The stored luminance weight value difference is restored to the luminance weight value for correcting lens shading for an input image in the restorer 230. For example, the luminance weight value of the reference edge pixel is added to a luminance weight value difference for a subsequent edge pixel to calculate a luminance weight value of the subsequent edge pixel and in the same method, a luminance weight value for another subsequent edge pixel is calculated on the basis of the calculated luminance weight value. When such a process is completed, the luminance weight values of all the edge pixels are calculated.

When the luminance weight value of each edge pixel is calculated, the luminance weight value calculator 240 calculates luminance weight values for all pixels of the corresponding block on the basis of the pixel weight values of four edge pixels of the corresponding block in each reference image block. In the exemplary embodiment, the luminance weight value calculator 240 calculates the luminance weight value of each pixel of the corresponding reference image block in proportion to distances between each pixel and four edge pixels with respect to each reference image block.

The luminance weight value of one pixel of the reference image block may be calculated in the same method as the method described with reference to FIGS. 4A and 4B. Such a process is performed for all pixels of the reference image block and in addition, such a process is performed even with respect to all the reference image blocks so as to calculate luminance weight value of all the pixels. Further, the weight calculation method is just one example, and another calculation method may also be applied.

The luminance corrector 250 receives an input image and multiplies the luminance weight value corresponding to the pixel calculated in the weight value calculator 240 by the corresponding luminance value for each pixel of the input image. At this time, when the luminance value of each pixel of the input image is corrected, the luminance weight value calculator 240 calculates the luminance weight value of the corresponding pixel and provides the calculated luminance weight value to the luminance corrector 250 in an on-the-fly scheme. Accordingly, the luminance weight value for each pixel does not need to be additionally stored.

In the exemplary embodiment of the present invention, when a corrected pixel value of the pixel of the input image, that is, a pixel value acquired by multiplying a luminance weight value of an original pixel value by the original pixel value is smaller than a predetermined set minimum value, the luminance corrector 250 preferably clamps the pixel value to a minimum value. For example, the minimum value may be 0. Further, when the corrected pixel value of the input image is larger than a predetermined set maximum value, the luminance corrector 250 preferably clamps the pixel value to the maximum value. For example, when the number of bits representing the pixel value is n, the maximum value may be $2^n$. Since the pixel value is a digital value, when the pixel value deviates from a range of a value which can be provided in terms of a characteristic of the digital value, a luminance value of an image actually displayed on a screen may be inverted. Therefore, it is possible to improve the quality of an output image by clamping the pixel value which deviates from the range to the maximum value or the minimum value.

Through such a process, a correction may be made for lens shading for the input images, and the corrected images may be output.

Next, referring to FIG. 8, a method for correcting lens shading of an image sensor according to another exemplary embodiment of the present invention will be described.

Figure 8:
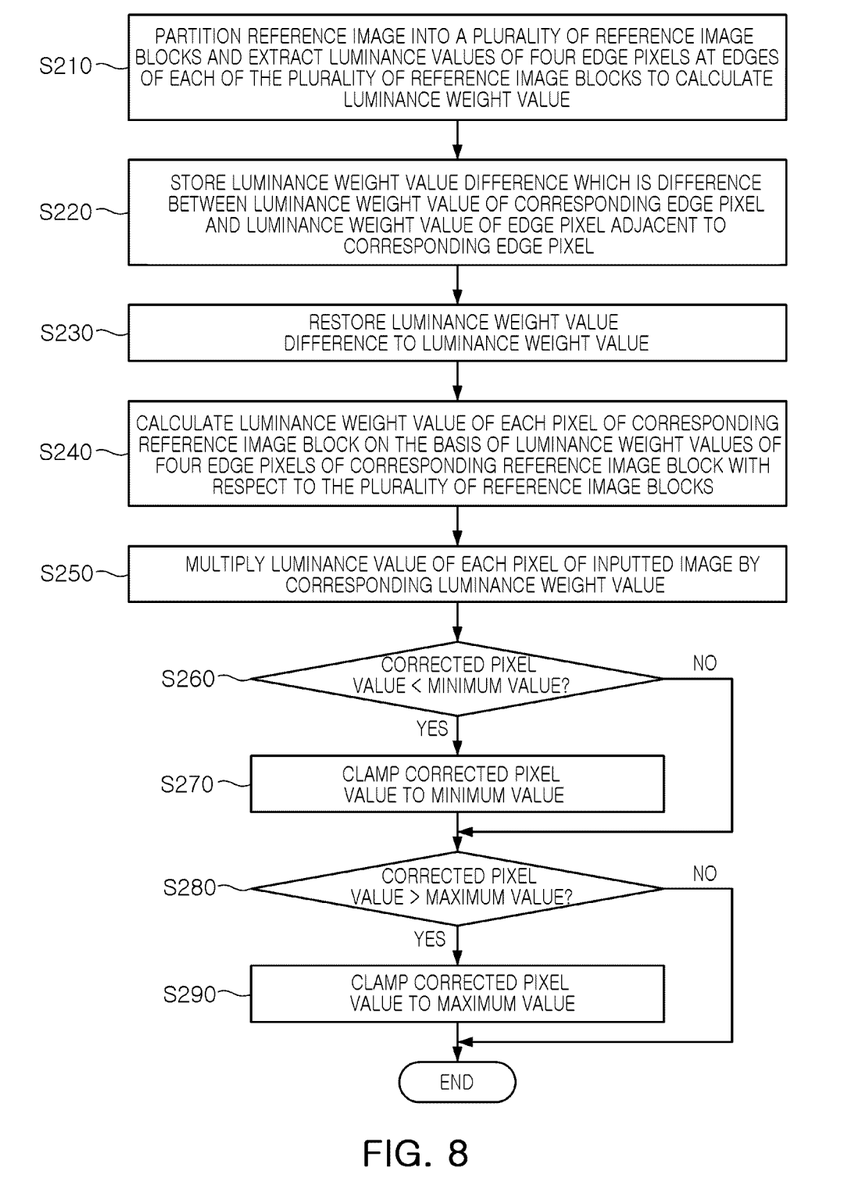
FIG. 8 is a flowchart illustrating a method for correcting lens shading of an image sensor according to another exemplary embodiment of the present invention.

FIG. 8 is a flowchart illustrating a method for correcting lens shading of an image sensor according to another exemplary embodiment of the present invention. As shown in FIG. 8, the method for correcting lens shading of an image sensor according to an exemplary embodiment of the present invention includes extracting the luminance of a reference image (S210), storing a luminance weight value difference (S220), restoring a luminance weight value (S230), calculating the luminance weight value (S240), correcting luminance (S250), clamping to a minimum value (S260 and S270), and clamping to a maximum value (S280 and S290).

At the extracting of the luminance of the reference image (S110), a reference image is partitioned into a plurality of reference image blocks and luminance values of four edge pixels in each of the plurality of reference image blocks are extracted so as to calculate luminance weight values of a plurality of edge pixels. At this time, the luminance weight value may be calculated on the basis of the brightest luminance value among the luminance values of all edge pixels extracted in the reference image.

During the storing of the luminance weight value difference (S220), the luminance weight value difference which is a difference between a luminance weight value of the corresponding edge pixel and a luminance weight value of an edge pixel adjacent to the corresponding edge pixel is stored with respect to each of the plurality of edge pixels. At this time, any one pixel of the plurality of edge pixels is used as a reference edge pixel and a luminance weight value difference may be calculated and stored in accordance with a predetermined order from the reference edge pixel to another edge pixel. Further, a difference between the luminance weight value of the corresponding edge pixel and a luminance weight value of an edge pixel just prior to the corresponding edge pixel in a predetermined order may be stored as the luminance weight value difference of the corresponding edge pixel with respect to the plurality of edge pixels.

During the restoring of the luminance weight value (S230), the luminance weight value is restored to the luminance weight value difference.

During the calculating of the luminance weight value (S240), a luminance weight value of each pixel of the corresponding reference image block is calculated on the basis of luminance weight values of four edge pixels of the corresponding reference image block with respect to each of the plurality of reference image blocks by using the luminance weight value restored at the restoring of the luminance weight value (S130). At this time, the luminance weight values of four edge pixels of the corresponding reference image block may be calculated in proportion to a distance between each pixel and four edge pixels with respect to each of the plurality of reference image blocks.

During the correcting of the luminance (S250), by multiplying a luminance value of each pixel of an input image by a luminance weight value for each pixel calculated in a luminance weight value calculator, the luminance of the input image is corrected. Thereafter, a corrected pixel value of the pixel of the input image is compared with a predetermined set minimum value (S260) and when the corrected pixel value of the pixel of the input image is smaller than the predetermined set minimum value (S260-YES), the corresponding pixel value is clamped to the minimum value (S270). Further, the corrected pixel value of the pixel of the input image is compared with a predetermined set maximum value (S280) and when the corrected pixel value of the pixel of the input image is smaller than the predetermined set minimum value (S280-YES), the corresponding pixel value is clamped to the minimum value (S290).

Figure 7:
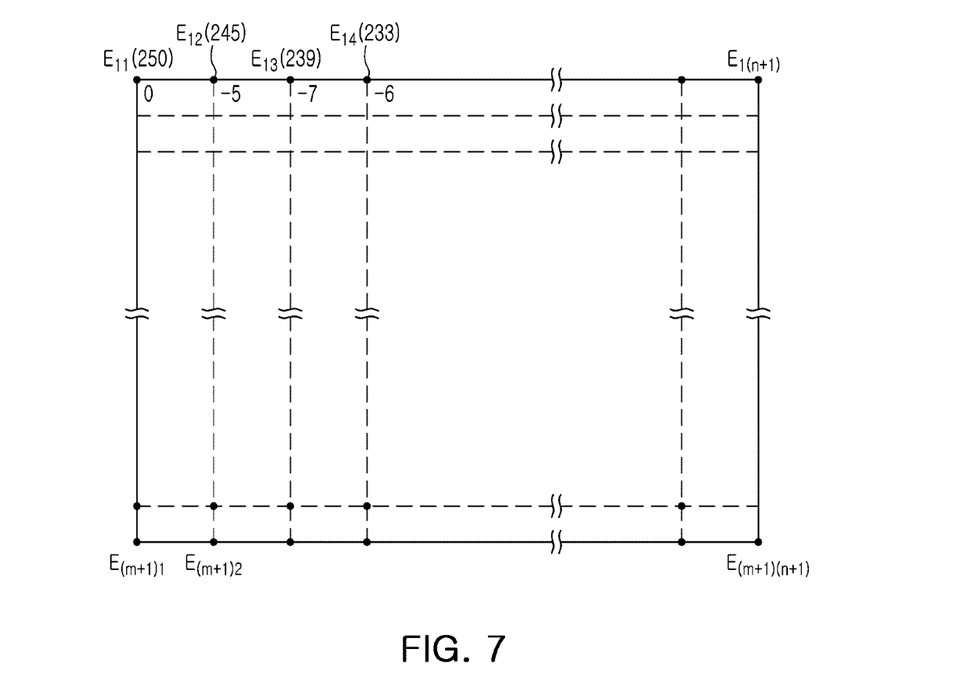
FIG. 7 is a schematic diagram for calculating a difference between luminance weight values according to another exemplary embodiment of the present invention.

A detailed description of each step illustrated in FIG. 8 corresponds to an operation of the image sensor according to the exemplary embodiment of the present invention described with reference to FIGS. 6 to 8, discussed in detail above.

As such, according to an apparatus and a method for correcting lens shading of the image sensor according to the exemplary embodiments of the present invention described herein, instead of previously calculating and storing the luminance weight values of all the pixels with respect to the reference image in a memory, the luminance weight values of four edge pixels for each of the partitioned reference image blocks are calculated and the luminance weight values of all the pixels are calculated by using the calculated luminance weight value at the time of correcting the luminance of the input image so as to reduce the size of a memory for storing the luminance weight value for correcting the lens shading.

Further, according to all of the various exemplary embodiments described above, since the luminance weight value of each pixel is calculated on the basis of the luminance weight value of each edge pixel by partitioning the reference image into the plurality of reference image blocks, the input image may be corrected in the case in which the lens shading phenomenon causes the problems illustrated in FIG. 2A and FIG. 2B. For example, the embodiments provide image correction where luminance decreases toward the edge from the center as shown in FIG. 2A, and also provide image correction in the case where luminance is high at a plurality of points and the luminance decreases as it is further from the plurality of points as shown in FIG. 2B.

Through such a process, the input image of which lens shading correction is completed among the input image is output as was discussed for each of the embodiments described above.

As set forth above, according to exemplary embodiments of the invention, there is provided a method and system capable of correcting lens shading.

While the present invention has been shown and described in connection with the exemplary embodiments, it will be apparent to those skilled in the art that modifications and variations can be made without departing from the spirit and scope of the invention as defined by the appended claims.

What is claimed is:

1. An image sensor, comprising:
   a reference image luminance extractor, operative to partition a reference image into a plurality of reference image blocks, extract luminance values of four edge pixels of each of the plurality of reference image blocks and calculate a luminance weight value for each of the edge pixels;
   a luminance weight value calculator operatively coupled to the reference image luminance extractor, operative to calculate a luminance weight value of each pixel of a corresponding reference image block, on the basis of luminance weight values of four edge pixels of the corresponding reference image block, for each of the plurality of reference image blocks; and
   a luminance corrector operatively coupled to the luminance weight value calculator, operative to correct the luminance of an input image by multiplying the luminance weight value for each pixel, calculated by the luminance weight value calculator, with a luminance value of each pixel of the input image.

2. The image sensor of claim 1, wherein the reference image luminance extractor is operative to calculate the luminance weight value on the basis of the brightest luminance value among luminance values of all the edge pixels extracted from the reference image.

3. The image sensor of claim 1, wherein the luminance weight value calculator is operative to calculate the luminance weight values of each pixel of the corresponding reference image block, in proportion to a distance between each pixel and the four edge pixels of the corresponding reference block for each of the plurality of reference image blocks.

4. The image sensor of claim 1, wherein the luminance corrector is operative to clamp a corrected pixel value to a predetermined set minimum value when the corrected pixel value is smaller than the predetermined set minimum value.

5. The image sensor of claim 1, wherein the luminance corrector is operative to clamp a corrected pixel value to a predetermined set maximum value when the corrected pixel value is larger than the predetermined set maximum value.

6. A method for correcting lens shading of an image sensor, comprising:
   partitioning a reference image into a plurality of reference image blocks and extracting luminance values of four edge pixels at the edges of each of the plurality of reference image blocks and calculating a luminance weight value for each of the edge pixels;
   calculating a luminance weight value of each pixel of a corresponding reference image block, on the basis of luminance weight values of four edge pixels of the corresponding reference image block, for each of the plurality of reference image blocks; and
   correcting the luminance of an input image by multiplying the luminance weight value for each pixel, calculated by the luminance weight value calculator, with a luminance value of each pixel of the input image,
   wherein at least one of the foregoing steps is performed by a processor or hardwired logic.

7. The method of claim 6, wherein calculating the luminance weight value for each of the edge pixels, comprises: calculating the luminance weight value on the basis of the brightest luminance value among luminance values of all the edge pixels extracted from the reference image.

8. The method of claim 6, wherein calculating the luminance weight value of each pixel of the corresponding reference image block, comprises: calculating the luminance weight value in proportion to a distance between each pixel and the four edge pixels of the corresponding reference block for each of the plurality of reference image blocks.

9. The method of claim 6, wherein correcting the luminance, comprises: clamping a corrected pixel value to a predetermined set minimum value when the corrected pixel value is smaller than the predetermined set minimum value.

10. The method of claim 6, wherein correcting the luminance, comprises: clamping a corrected pixel value to a predetermined maximum value when the corrected pixel value is larger than the predetermined set maximum value.

11. An image sensor, comprising:
    a reference image luminance extractor, operative to partition a reference image into a plurality of reference image blocks, extract luminance values of four edge pixels at the edges of each of the plurality of reference image blocks, and calculate a luminance weight value for each of a plurality of edge pixels;
    a luminance weight value difference storage, operatively coupled to the reference image luminance extractor, operative to store a luminance weight value difference between a luminance weight value of an edge pixel and a luminance weight value of an adjacent edge pixel, adjacent to the edge pixel, for each of the plurality of edge pixels;
    a luminance weight value restorer, operatively coupled to the luminance weight value difference storage, operative to restore the luminance weight value difference to the luminance weight value;
    a luminance weight value calculator, operatively coupled to the luminance weight value restorer, operative to calculate a luminance weight value of each pixel of a corresponding reference image block on the basis of luminance weight values of four edge pixels of the corresponding reference image block for the plurality of reference image blocks by using the luminance weight value restored in the luminance weight value restorer; and a luminance corrector, operatively coupled to the luminance weight value calculator, operative to correct the luminance of an input image by multiplying a luminance weight value for each pixel, calculated in the luminance weight value calculator, by a luminance value of each pixel of the input image.

12. The image sensor of claim 11, wherein the size of data representing the luminance weight value difference is smaller than the size of data representing the luminance weight value.

13. The image sensor of claim 11, wherein the luminance weight value difference storage is operative to calculate and store the luminance weight value difference in accordance with a predetermined set order from a reference edge pixel to another edge pixel by using any one pixel of the plurality of edge pixels as the reference edge pixel.

14. The image sensor of claim 13, wherein the luminance weight value difference storage is further operative to store a difference between the luminance weight value of the edge pixel and a luminance weight value just prior to the corresponding edge pixel in the predetermined set order with respect to each of the plurality of edge pixels.

15. The image sensor of claim 11, wherein the reference image luminance extractor is operative to calculate the luminance weight value on the basis of the brightest luminance value among luminance values of all the edge pixels extracted from the reference image.

16. The image sensor of claim 11, wherein the luminance weight value calculator is operative to calculate the luminance weight values of four edge pixels of the corresponding reference image block in proportion to a distance between each pixel and four edge pixels with respect to each of the plurality of reference image blocks.

17. The image sensor of claim 11, wherein the luminance corrector is operative to clamp a corrected pixel value to a predetermined set minimum value when the corrected pixel value is smaller than the predetermined set minimum value.

18. The image sensor of claim 11, wherein the luminance corrector is operative to clamp the corrected pixel value to a predetermined set maximum value when the corrected pixel value is larger than the predetermined set maximum value.

19. A method for correcting lens shading of an image sensor, comprising:

partitioning a reference image into a plurality of reference image blocks, extracting luminance values of four edge pixels at the edges of each of the plurality of reference image blocks and calculating a luminance weight value for each of the edge pixels;

storing a luminance weight value difference between a luminance weight value of an edge pixel and a luminance weight value of an adjacent edge pixel, adjacent to the edge pixel, for each of the plurality of edge pixels;

restoring the luminance weight value difference to the luminance weight value;

calculating a luminance weight value of each pixel of a corresponding reference image block on the basis of luminance weight values of four edge pixels of the corresponding reference image block for the plurality of reference image blocks by using the luminance weight value restored in the luminance weight value restorer; and correcting the luminance of an input image by multiplying a luminance weight value for each pixel, calculated in the luminance weight value calculator, by a luminance value of each pixel of the input image, wherein at least one of the foregoing steps is performed by a processor or hardwired logic.

20. The method of claim 19, wherein the size of data representing the luminance weight value difference is smaller than the size of data representing the luminance weight value.

21. The method of claim 19, wherein storing the luminance weight value difference, comprises: calculating and storing the luminance weight value difference in accordance with a predetermined set order from a reference edge pixel to another edge pixel by using any one pixel of the plurality of edge pixels as the reference edge pixel.

22. The method of claim 20, wherein storing the luminance weight value difference, comprises storing a difference between the luminance weight value of the corresponding pixel and a luminance weight value just prior to the corresponding edge pixel in the predetermined set order with respect to each of the plurality of edge pixels.

23. The method of claim 19, wherein calculating the luminance weight value for each of the edge pixels, comprises: calculating the luminance weight value on the basis of the brightest luminance value among luminance values of all the edge pixels extracted from the reference image.

24. The method of claim 19, wherein calculating the luminance weight value of each pixel of the corresponding reference image block, comprises: calculating the luminance weight value in proportion to a distance between each pixel and the four edge pixels of the corresponding reference block for each of the plurality of reference image blocks.

25. The method of claim 19, wherein correcting the luminance, comprises: clamping a corrected pixel value to a predetermined set minimum when the corrected pixel value is smaller than the predetermined set minimum value.

26. The method of claim 19, wherein correcting the luminance, comprises: clamping a corrected pixel value to a predetermined maximum value when the corrected pixel value is larger than the predetermined set maximum value.

* * * * *